(12) United States Patent
Fujii et al.

(10) Patent No.: US 8,041,406 B2
(45) Date of Patent: Oct. 18, 2011

(54) PORTABLE INFORMATION TERMINAL EQUIPMENT

(75) Inventors: Mika Fujii, Tokyo (JP); Sumiyo Shiosaka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 12/779,352

(22) Filed: May 13, 2010

(65) Prior Publication Data

US 2010/0222114 A1 Sep. 2, 2010

Related U.S. Application Data

(62) Division of application No. 11/544,589, filed on Oct. 10, 2006, now Pat. No. 7,756,555, which is a division of application No. 10/693,920, filed on Oct. 28, 2003, now Pat. No. 7,136,686.

(30) Foreign Application Priority Data

Oct. 30, 2002 (JP) .................................. 2002-316655
Aug. 27, 2003 (JP) .................................. 2003-303568

(51) Int. Cl.
*H04M 1/00* (2006.01)

(52) U.S. Cl. ............... 455/575.3; 455/575.4; 455/550.1; 361/679.27; 345/169

(58) Field of Classification Search ............... 455/575.3, 455/575.4, 550.1; 361/679.27; 345/169
See application file for complete search history.

(56) References Cited

U.S. PATENT DOCUMENTS

| | | | |
|---|---|---|---|
| 5,657,370 A | 8/1997 | Tsugane et al. | |
| 6,020,878 A * | 2/2000 | Robinson | 345/173 |
| 6,466,202 B1 * | 10/2002 | Suso et al. | 345/169 |
| 6,662,244 B1 * | 12/2003 | Takahashi | 710/14 |
| 6,670,954 B2 * | 12/2003 | Arai et al. | 345/420 |
| 6,714,403 B2 * | 3/2004 | Furuki et al. | 361/679.09 |
| 6,768,637 B1 * | 7/2004 | Amemiya | 361/679.55 |
| 6,842,627 B2 * | 1/2005 | Harsu et al. | 455/550.1 |
| 6,944,481 B2 | 9/2005 | Hama et al. | |
| 6,985,759 B2 * | 1/2006 | Ona | 455/575.3 |
| 7,027,823 B2 * | 4/2006 | Mikuni | 455/457 |
| 2002/0173281 A1 | 11/2002 | Kobayashi | |
| 2002/0177418 A1 | 11/2002 | Kido | |
| 2002/0198006 A1 | 12/2002 | Hirayama et al. | |
| 2003/0064750 A1 | 4/2003 | Oh et al. | |
| 2003/0064758 A1 | 4/2003 | Mizuta et al. | |
| 2003/0153372 A1 | 8/2003 | Shimamura et al. | |

(Continued)

FOREIGN PATENT DOCUMENTS

EP 0 661 824 A1 7/1995

(Continued)

*Primary Examiner* — Danh Le
(74) *Attorney, Agent, or Firm* — Foley & Lardner LLP

(57) ABSTRACT

Portable information terminal equipment having a function to perform the informing process at the time of reception in cooperation with a connecting section driving mechanism as well as a function to enable the open/close movement of the upper and lower units through one-touch operation making use of the connecting section driving mechanism. Depending on informing modes, a motor drive circuit drives a motor under the control of a controller on receipt of a call or a message to apply a driving force to the open/close mechanism of a hinge unit. Thereby, the portable information terminal equipment is folded/unfolded, that is, the posture of the portable information terminal equipment is changed, and a user is informed of the receipt of the call or the message. Besides, the portable information terminal equipment performs conventional informing processes, such as ringing, light emitting, message or image display and the like, in combination with the open/close or rotative operation.

40 Claims, 12 Drawing Sheets

U.S. PATENT DOCUMENTS

| | | |
|---|---|---|
| 2003/0190896 A1 | 10/2003 | Ota et al. |
| 2004/0203532 A1 | 10/2004 | Mizuta |

FOREIGN PATENT DOCUMENTS

| | | |
|---|---|---|
| EP | 1 233 596 A2 | 8/2002 |
| EP | 1 244 275 A1 | 9/2002 |
| GB | 2 350 516 A | 11/2000 |
| JP | 7-288860 | 10/1995 |
| JP | 7-312631 | 11/1995 |
| JP | 11-187087 | 7/1999 |
| JP | 2002-271464 | 9/2002 |
| JP | 2002-281116 | 9/2002 |
| WO | WO 2004/062238 A2 | 7/2004 |

* cited by examiner

F I G. 1
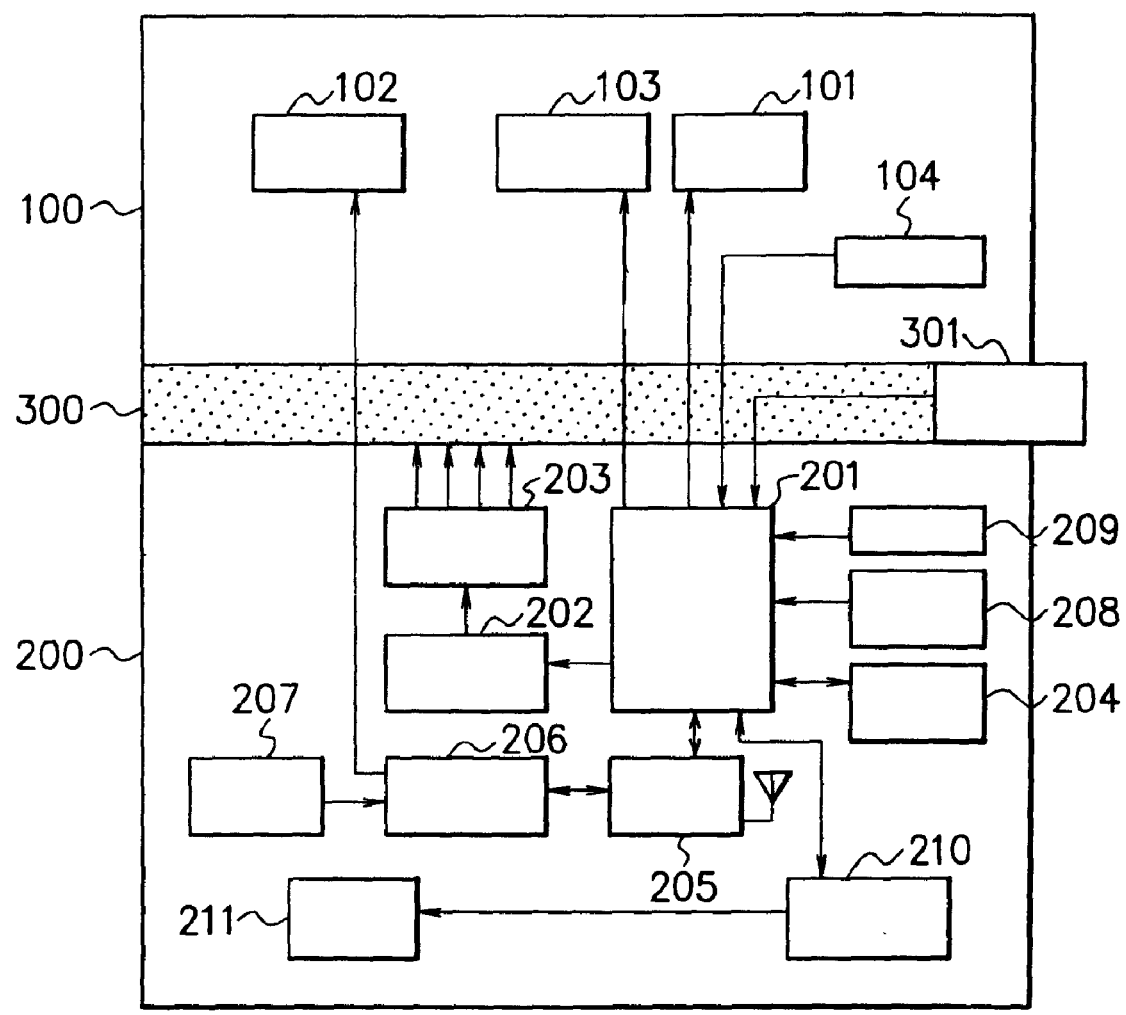

| SENDER INFORMATION | OPEN / CLOSE POSITION (1) | OPEN / CLOSE POSITION (2) | OPEN / CLOSE POSITION (1)' |
|---|---|---|---|
| AAA-BBBB-CCCC | 30° | 0° | 0° |
| DDD-EEEE-FFFF | 45° | 0° | 0° |
| GGG-HHHH-IIII | 60° | 30° | 0° |
| JJJ-KKKK-LLLL | 75° | 45° | 5° |
| MMM-NNNN-OOOO | 90° | 60° | 10° |

| RECEIVED MESSAGE INFORMATION | OPEN / CLOSE POSITION (1) | OPEN / CLOSE POSITION (2) | OPEN / CLOSE POSITION (1)' |
|---|---|---|---|
| Lowest | 30° | 0° | 0° |
| Low | 45° | 0° | 0° |
| Normal | 60° | 30° | 0° |
| High | 75° | 45° | 5° |
| Highest | 90° | 60° | 10° |

FIG. 6

| SENDER INFORMATION | OPEN / CLOSE POSITION (3) | OPEN / CLOSE POSITION (4) | OPEN / CLOSE POSITION (5) |
|---|---|---|---|
| AAA-BBBB-CCCC | 30° | 0° | 0° |
| DDD-EEEE-FFFF | 45° | 0° | 0° |
| GGG-HHHH-IIII | 60° | 30° | 0° |
| JJJ-KKKK-LLLL | 75° | 45° | 5° |
| MMM-NNNN-OOOO | 90° | 60° | 10° |

| RECEIVED MESSAGE INFORMATION | OPEN / CLOSE POSITION (3) | OPEN / CLOSE POSITION (4) | OPEN / CLOSE POSITION (5) |
|---|---|---|---|
| Lowest | 30° | 0° | 0° |
| Low | 45° | 0° | 0° |
| Normal | 60° | 30° | 0° |
| High | 75° | 45° | 5° |
| Highest | 90° | 60° | 10° |

| SENDER INFORMATION | OPEN / CLOSE POSITION (6) | OPEN / CLOSE POSITION (7) | OPEN / CLOSE POSITION (8) |
|---|---|---|---|
| AAA-BBBB-CCCC | 0° | 30° | 0° |
| DDD-EEEE-FFFF | 0° | 45° | 0° |
| GGG-HHHH-IIII | 30° | 60° | 0° |
| JJJ-KKKK-LLLL | 45° | 75° | 5° |
| MMM-NNNN-OOOO | 60° | 90° | 10° |

F I G. 10
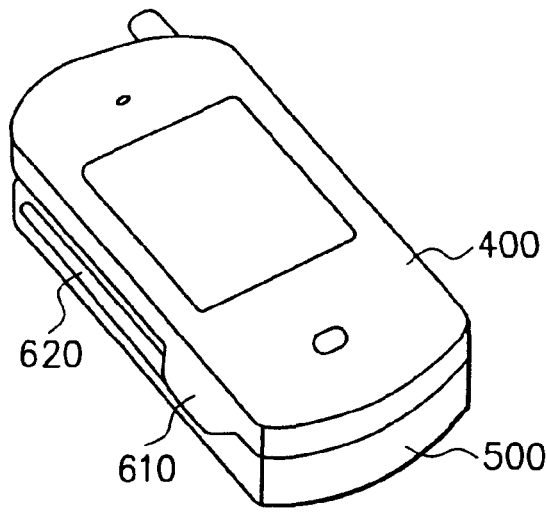
F I G. 11
| SENDER INFORMATION | OPEN / CLOSE POSITION (1) | OPEN / CLOSE POSITION (2) | OPEN / CLOSE POSITION (1)' |
|---|---|---|---|
| AAA-BBBB-CCCC | 10mm | 0 | 0° |
| DDD-EEEE-FFFF | 15mm | 0 | 0° |
| GGG-HHHH-IIII | 20mm | 10mm | 0° |
| JJJ-KKKK-LLLL | 25mm | 15mm | 3mm |
| MMM-NNNN-OOOO | 30mm | 20mm | 6mm |
| RECEIVED MESSAGE INFORMATION | OPEN / CLOSE POSITION (1) | OPEN / CLOSE POSITION (2) | OPEN / CLOSE POSITION (1)' |
|---|---|---|---|
| Lowest | 10mm | 0 | 0° |
| Low | 15mm | 0 | 0° |
| Normal | 20mm | 10mm | 0° |
| High | 25mm | 15mm | 3mm |
| Highest | 30mm | 20mm | 6mm |

F I G. 12
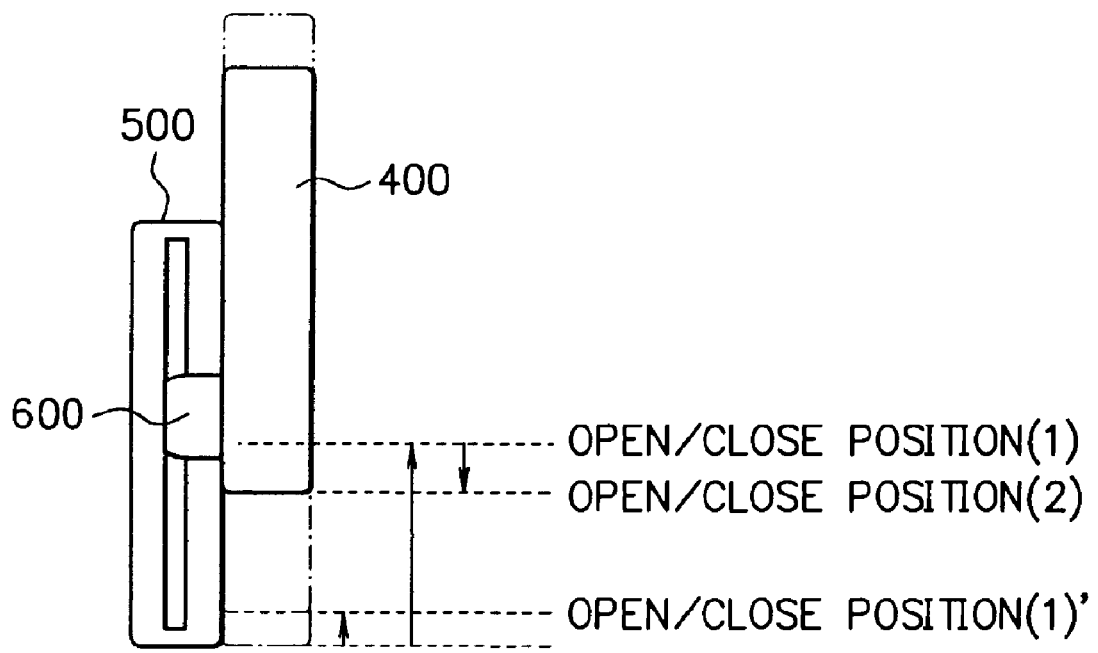

F I G. 13
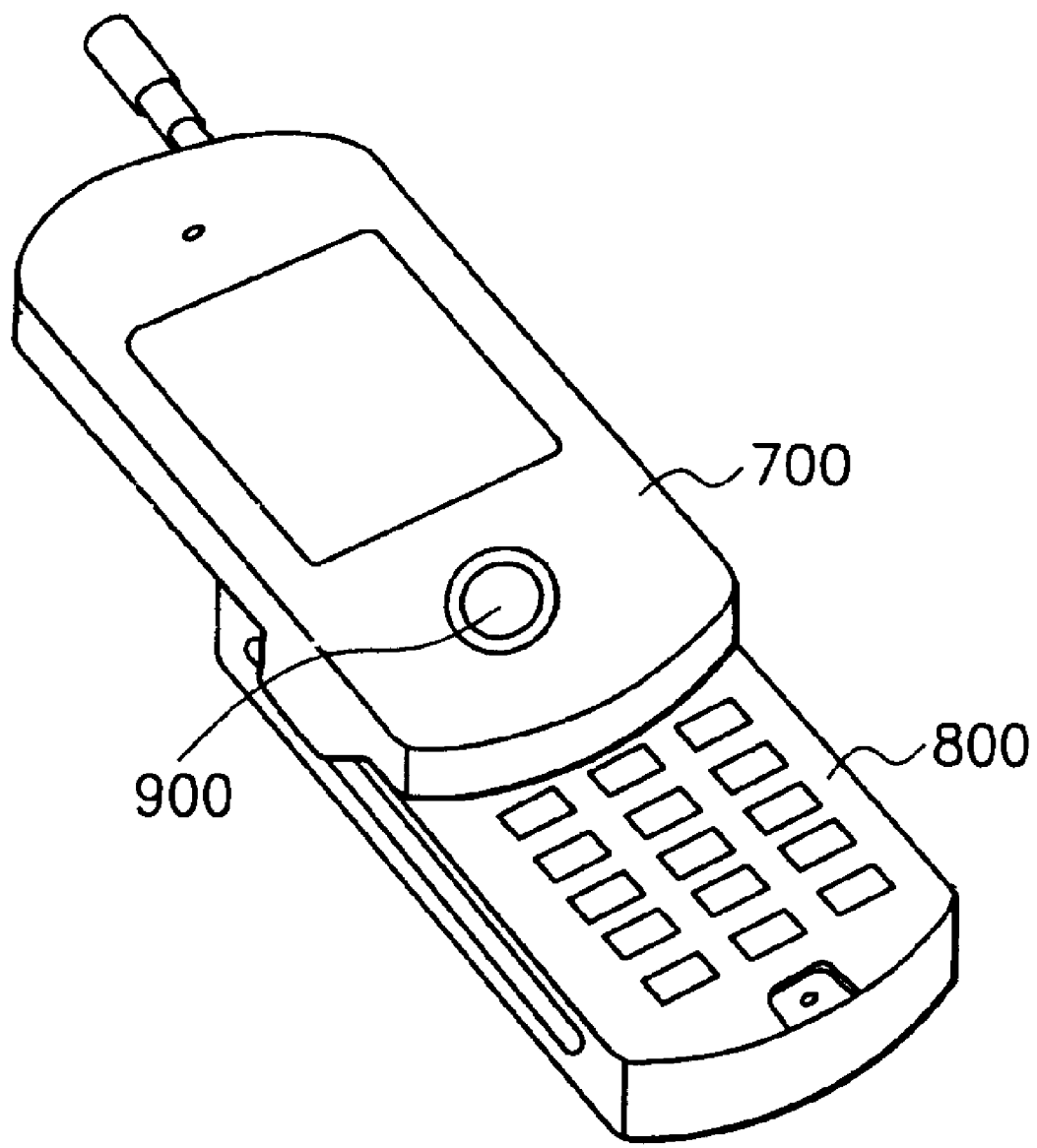

F I G. 14
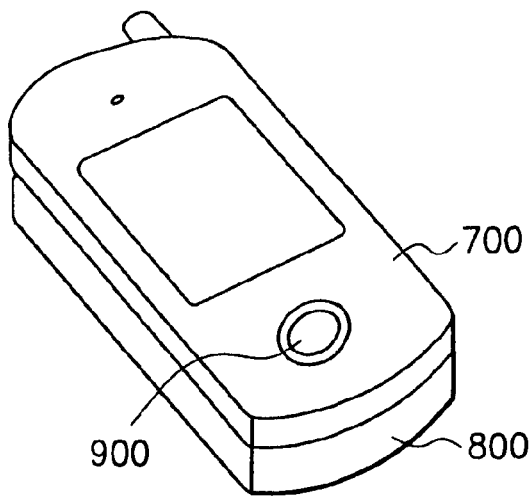
F I G. 15
| SENDER INFORMATION | OPEN / CLOSE POSITION (1) | OPEN / CLOSE POSITION (2) | OPEN / CLOSE POSITION (1)' |
|---|---|---|---|
| AAA-BBBB-CCCC | 30° | 0° | 0° |
| DDD-EEEE-FFFF | 45° | 0° | 0° |
| GGG-HHHH-IIII | 60° | 30° | 0° |
| JJJ-KKKK-LLLL | 75° | 45° | 5° |
| MMM-NNNN-OOOO | 90° | 60° | 10° |
| RECEIVED MESSAGE INFORMATION | OPEN / CLOSE POSITION (1) | OPEN / CLOSE POSITION (2) | OPEN / CLOSE POSITION (1)' |
|---|---|---|---|
| Lowest | 30° | 0° | 0° |
| Low | 45° | 0° | 0° |
| Normal | 60° | 30° | 0° |
| High | 75° | 45° | 5° |
| Highest | 90° | 60° | 10° |

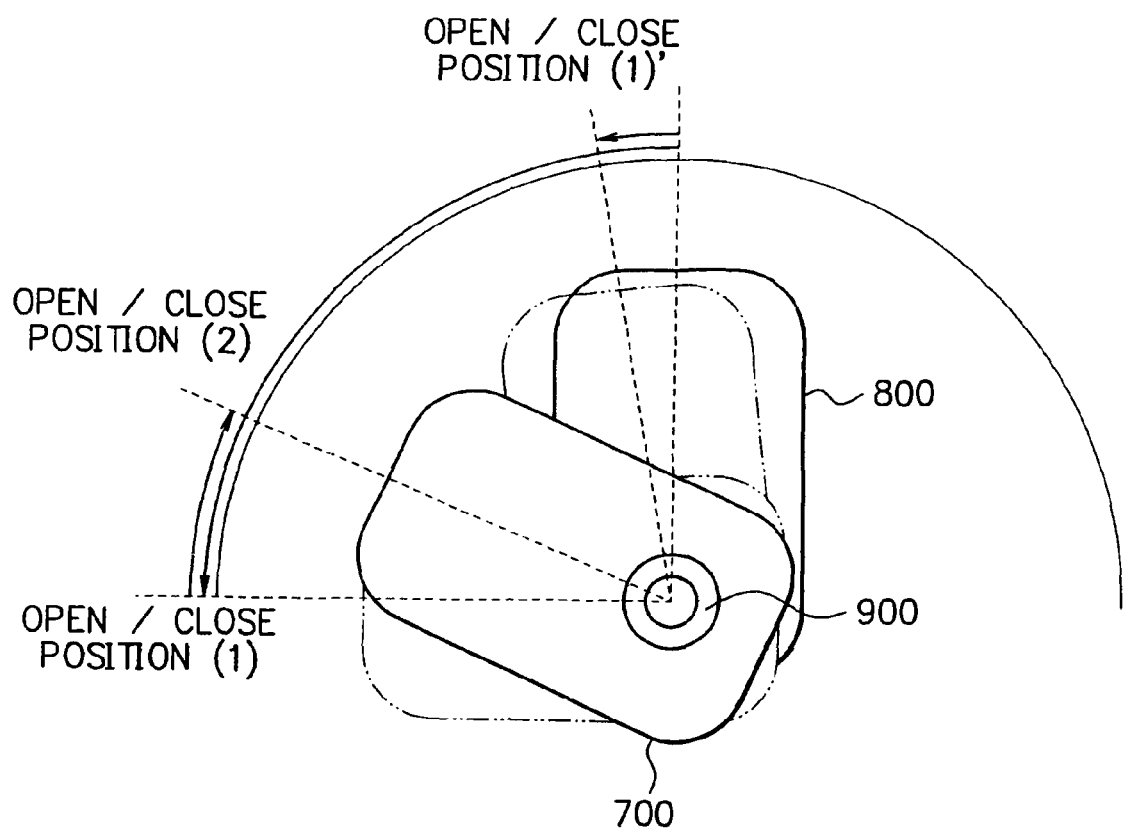

PORTABLE INFORMATION TERMINAL EQUIPMENT

CROSS-REFERENCE TO RELATED PATENT APPLICATIONS

This application is a division of application Ser. No. 11/544,589, filed Oct. 10, 2006, now pending, which is a division of application Ser. No. 10/693,920, filed Oct. 28, 2003, now U.S. Pat. No. 7,136,686, issued Nov. 14, 2006, which claims priority from Japanese Patent Application No. 2002-316655, filed Oct. 30, 2002, and Japanese Patent Application No. 2003-303568, filed Aug. 27, 2003, by Mika Fujii and Sumiyo Shiosaka, all of which are incorporated herein by reference in their entirety. This application claims only subject matter disclosed in the parent application and therefore presents no new matter.

FIELD OF THE INVENTION

The present invention relates to portable information terminal equipment comprised of two units coupled to one another such as a folding cellular phone.

BACKGROUND OF THE INVENTION

Folding cellular phones have been in widespread use. A general folding cellular phone is comprised of an upper unit having a display, etc. and a lower unit having an operating section, etc., which are rotationally connected to each other with a hinge so as to be foldable (openable and closable). Besides, there has been proposed a folding cellular phone provided with a hinge driving mechanism. The folding cellular phone has a built-in hinge driving mechanism including a motor and the like to enable the opening/closing or rotational movement of the upper and lower units round the axis of a hinge unit.

The aforementioned folding cellular phone with a hinge driving mechanism has a switch to drive the motor for opening/closing the upper and lower units so that a user can open/close the units at the flip of the switch. However, the functions of the folding cellular phone have not been fully developed, and the cellular phone is insufficient in usability and the like. Much the same is true for various portable information terminals, having two bodies (units) connected to one another by means other than a hinge.

On the other hand, portable information terminal equipment such as a folding cellular phone informs a user of the receipt of a call or an e-mail message, etc. in a prescribed manner, as for example by a ring tone, flashing lights, vibrations, and a display of characters or images.

There is found folding portable communication equipment having an upper body and a lower body, which are immediately opened when receiving a transmission in Japanese Patent Application laid open No. 2002-281116. In the folding portable communication equipment, when a reception detecting means detects the receipt of a transmission, a control means controls a drive means to open the upper and lower bodies. However, the folding portable communication equipment does not perform the informing process at the time of reception in cooperation with the drive means to improve usability.

SUMMARY OF THE INVENTION

It is therefore an object of the present invention to provide portable information terminal equipment comprised of an upper unit and a lower unit which are rotationally connected to each other with a connecting section such as a hinge, including a connecting section driving mechanism such as a hinge driving mechanism for driving the connecting section, and having a function to perform the informing process at the time of reception in cooperation with the connecting section driving mechanism as well as a function to enable the open/close movement of the upper and lower units through one-touch operation making use of the connecting section driving mechanism, thus improving the usability and convenience of users.

In accordance with the first aspect of the present invention, to achieve the above object, there is provided portable information terminal equipment comprising: two units; a connecting section for connecting the two units with each other for relative movement; a connecting section driving mechanism for changing the relative positions of the two units to open/close the units; and a controller for controlling the connecting section driving mechanism to move either or both the units so that they are located in prescribed relative positions when receiving a call or a message to thereby inform a user of the receipt of the call or the message.

In this construction, the two units are automatically arranged in prescribed relative positions on receipt of a call or a message, which enables a user to be informed of the receipt of the call or the message.

Incidentally, examples of the connecting section include, but are not limited to a hinge unit, a slide structure and a rotative connector.

In accordance with the second aspect of the present invention, there is provided portable information terminal equipment comprising: two units; a connecting section for connecting the two units with each other for relative movement; a connecting section driving mechanism for changing the relative positions of the two units to open/close the units; and a controller for controlling the connecting section driving mechanism to move either or both the units so that they are located in prescribed relative positions when receiving a call or a message based on information about the sender of the call or the message (sender information) and/or the received message (received message information) to thereby inform a user of the receipt of the call or the message.

With this construction, it is possible to automatically arrange the two units in prescribed relative positions on receipt of a call or a message according to the sender information (sender address, etc.) and/or received message information (priority, specific keyword, etc.).

In accordance with the third aspect of the present invention, in the first or second aspect, the controller provides open/close operation control so that the two units are located in prescribed relative positions when an incoming call is not answered or acknowledged.

With this construction, it is possible to indicate an unacknowledged call by moving the two units into prescribed relative positions.

In accordance with the fourth aspect of the present invention, in one of the first to third aspects, the portable information terminal equipment further comprises a detector for detecting the placed condition of the equipment, and the controller provides open/close operation control based on the placed condition of the equipment detected by the detector.

In this construction, the detector detects the placed condition of the portable information terminal equipment, as for example that the equipment is laid on a desk in closed condition. Thus, it is possible to automatically arrange the two units in prescribed relative positions according to the placed condition of the portable information terminal equipment.

In accordance with the fifth aspect of the present invention, in one of the second to fourth aspects, the portable information terminal equipment further comprises a setting interface for registering user settings with respect to the sender information, received message information and the relative positions of the two units, and the controller provides open/close operation control in a manner so as to change the relative positions of the units when receiving a call or a message based on the user settings.

In this construction, the portable information terminal equipment is provided with means for allowing each user to register settings with respect to the association between each sender or the type of a received message (priority) and the relative positions of the two units. Thus, it is possible to inform a user of the receipt of a call or a message by arranging the two units in prescribed relative positions according to individual settings determined by the user.

In accordance with the sixth aspect of the present invention, in one of the first to fifth aspects, the two units repeatedly open/close at prescribed intervals under the control of the controller.

With this construction, it is possible to inform a user of the receipt of a call or a message not only by arranging the two units in prescribed relative positions but also by making the two units repeatedly open/close (move to and from the prescribed relative positions) during the informing period.

In accordance with the seventh aspect of the present invention, in one of the first to sixth aspects, the portable information terminal equipment further comprises a battery state detector for detecting whether or not a battery, which is a power supply for driving the equipment, is being charged and/or the remaining amount of charge in the battery, and the controller effects control of the connecting section driving mechanism based on the result of the detection by the battery state detector.

With this construction, it is possible to control the connecting section driving mechanism based on whether or not a battery is being charged and the remaining amount of charge in the battery.

In accordance with the eighth aspect of the present invention, in one of the first to seventh aspects, when an incoming call is not answered or acknowledged, the two units are arranged in prescribed relative positions according to the number of unacknowledged calls (unattended receipt of calls) from the same sender during a prescribed time period under the control of the controller.

With this construction, it is possible to indicate unacknowledged calls according to the number of unacknowledged calls from the same sender during a prescribed time period.

In accordance with the ninth aspect of the present invention, in one of the first to eighth aspects, the connecting section has a slide structure including slide rails set on one of the units and slide parts set on the other unit in sliding engagement with the slide rails, and the connecting section driving mechanism changes the relative positions of the two units by sliding the unit having the slide parts along the slide rails.

In accordance with the tenth aspect of the present invention, in one of the first to eighth aspects, the connecting section rotatably supports the two units on a rotation axis substantially perpendicular to a display surface, and the connecting section driving mechanism changes the relative positions of the two units by rotating either or both the units on the rotation axis.

In accordance with the eleventh aspect of the present invention, there is provided portable information terminal equipment comprising: upper and lower units coupled to one another by a hinge unit; a hinge driving mechanism for changing the relative positions of the upper and lower units by rotating either or both the units; and a controller for controlling the hinge driving mechanism to move (open/close or rotate) the upper and/or lower unit(s) so that they are located at a prescribed angle to each other when receiving a call or a message to thereby inform a user of the receipt of the call or the message.

In this construction, the upper and lower units are automatically arranged in prescribed positions so that they are located at a prescribed angle to each other on receipt of a call or a message, which enables a user to be informed of the receipt of the call or the message.

In accordance with the twelfth aspect of the present invention, there is provided portable information terminal equipment comprising: upper and lower units coupled to one another by a hinge unit; a hinge driving mechanism for changing the relative positions of the upper and lower units by rotating either or both the units; and a controller for controlling the hinge driving mechanism to move (open/close or rotate) the upper and/or lower unit(s) so that they are located at a prescribed angle to each other when receiving a call or a message based on information about the sender of the call or the message (sender information) and/or the received message (received message information) to thereby inform a user of the receipt of the call or the message.

With this construction, it is possible to automatically arrange the upper and lower units in prescribed positions according to the sender information (sender address, etc.) and/or received message information (priority, specific keyword, etc.) on receipt of a call or a message so that they are located at a prescribed angle to each other.

In accordance with the thirteenth aspect of the present invention, in the eleventh or twelfth aspect, the controller provides open/close (rotation) operation control so that the upper and lower units are located at a prescribed angle to each other when an incoming call is not answered or acknowledged.

With this construction, it is possible to indicate an unacknowledged call by automatically moving either or both the upper and lower units so that they are located at a prescribed angle to each other.

In accordance with the fourteenth aspect of the present invention, in one of the eleventh to thirteenth aspects, the portable information terminal equipment further comprises a detector for detecting the placed condition of the equipment, and the controller provides open/close (rotation) operation control based on the placed condition of the equipment detected by the detector.

In this construction, the detector detects the placed condition of the portable information terminal equipment, as for example that the equipment is laid on a desk in closed condition. Thus, it is possible to automatically move either or both the upper and lower units according to the placed condition of the portable information terminal equipment so that they are located at a prescribed angle to each other.

In accordance with the fifteenth aspect of the present invention, in one of the twelfth to fourteenth aspects, the portable information terminal equipment further comprises a setting interface for registering user settings with respect to open/close positions (angles formed between the upper and lower units) associated with the sender information and/or received message information, and the controller controls the hinge driving mechanism in a manner so as to change the angle formed between the upper and lower units when receiving a call or a message based on the user settings.

In this construction, the portable information terminal equipment is provided with means for allowing each user to register settings with respect to the association between each sender or the type of a received message (priority) and the open/close position. Thus, it is possible to inform a user of the receipt of a call or a message by moving either or both the upper and lower units according to individual settings determined by the user so that they are located at a prescribed angle to each other.

In accordance with the sixteenth aspect of the present invention, in one of the eleventh to fifteenth aspects, the upper and lower units repeatedly open/close at prescribed intervals under the control of the controller.

With this construction, it is possible to inform a user of the receipt of a call or a message not only by rotating the upper and lower units so that they are located at a prescribed angle to each other but also by repeatedly opening/closing the units (by repeatedly rotating the units prescribed degrees back and forth) during the informing period.

As set forth hereinabove, in accordance with the present invention, the two units are arranged in prescribed relative positions when receiving a call or a message to thereby inform a user of the receipt of the call or the message. Thus, it is possible to improve the usability and convenience of the user.

Moreover, even if the portable information terminal equipment is folded when receiving a call or a message, the two units are arranged in prescribed relative positions so as to be open. Consequently, it is possible to inform a user of the receipt of the call or the message effectively making use of a speaker and a display located on the inside surface (display surface) of the upper unit.

BRIEF DESCRIPTION OF THE DRAWINGS

The objects and features of the present invention will become more apparent from the consideration of the following detailed description taken in conjunction with the accompanying drawings in which:

FIG. 1 is a block diagram showing the configuration of a folding cellular phone with a hinge driving mechanism according to an embodiment of the present invention;

FIG. 3 shows examples of open/close operation setting information for the folding cellular phone depicted in FIG. 1 in call/mail receive informing mode, in which

FIG. 6 shows examples of open/close operation setting information for the folding cellular phone depicted in FIG. 1 in battery state informing mode;

FIG. 10 is an exterior view of the sliding cellular phone depicted in FIG. 9 in closed condition;

FIG. 11 shows examples of open/close operation setting information for the sliding cellular phone depicted in FIG. 9 in call/mail receive informing mode;

FIG. 12 is a side view of the sliding cellular phone depicted in FIG. 9 showing examples of open/close positions;

FIG. 13 is an exterior view of a turning cellular phone in open condition according to an embodiment of the present invention;

FIG. 14 is an exterior view of the turning cellular phone depicted in FIG. 13 in closed condition;

FIG. 15 shows examples of open/close operation setting information for the turning cellular phone depicted in FIG. 13 in call/mail receive informing mode; and FIG. 16 is an overhead view of the turning cellular phone depicted in FIG. 13 showing examples of open/close positions.

DETAILED DESCRIPTION OF THE PREFERRED EMBODIMENTS

Figure 2:
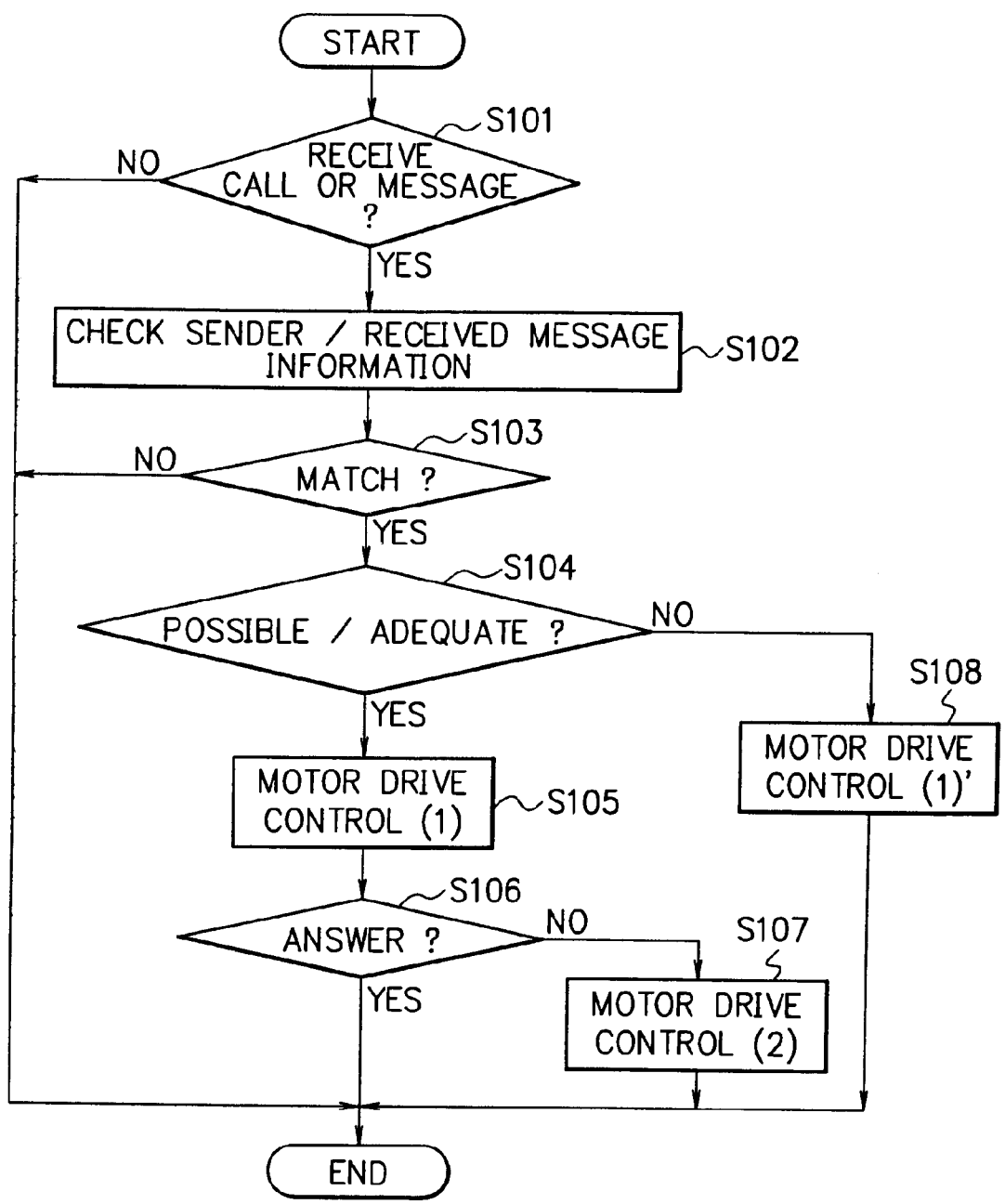
FIG. 2 is a flowchart for explaining the operation of the folding cellular phone with a hinge driving mechanism depicted in FIG. 1 in call/mail receive informing mode.

Referring now to the drawings, a description of a preferred embodiment of the present invention will be given in detail.

First, a description will be made of the case where the present invention is applied to a folding cellular phone with a hinge driving mechanism.

FIG. 1 is a block diagram showing the configuration of a folding cellular phone with a hinge driving mechanism according to an embodiment of the present invention. FIG. 2 is a flowchart for explaining the operation of the folding cellular phone with a hinge driving mechanism in call/mail receive informing mode.

The folding cellular phone according to this embodiment is provided with a hinge driving mechanism to enable the opening/closing movement of upper and lower units through one-touch operation. The upper and lower units of the folding cellular phone automatically open/close or rotate when receiving a call, a message or the like to inform a user of the receipt of the call or the message, thereby improving the usability and convenience of users. In the case, for example, where the folding cellular phone receives a transmission when its body is in folded condition, the hinge driving mechanism rotates the upper and/or lower units so as to unfold the body. Thus, a user is informed as to the receipt of the transmission. The hinge driving mechanism may rotate (open/close) the upper and/or lower units when receiving a call, a message, etc. based on information about the sender of the call or the message (sender information) and/or the received message (received message information).

As can be seen in FIG. 1, the folding cellular phone with a hinge driving mechanism of this embodiment comprises an upper unit 100, a lower unit 200 and a hinge unit 300. The hinge unit 300 rotatably connects the edges of the upper unit 100 and the lower unit 200. The upper unit 100 has electrical interconnection with the lower unit 200 via FPC, etc. running through the hinge unit 300.

The upper unit 100 includes a display 101, a speaker 102, an informing speaker 103 and a light sensor 104. The display 101, speaker 102, and informing speaker 103 are disposed on the display surface (inside surface) of the upper unit 100, and the light sensor 104 is disposed on the reverse (outside surface).

The display 101 consists of, for example, a liquid crystal display (LCD) having a rectangular shape, and displays a wide variety of information and images such as incoming call information. The speaker 102 outputs the voice of a calling party during a conversation on the folding cellular phone. The informing speaker 103 outputs, for example, a melody signaling an incoming call.

The light sensor 104 is a unit for detecting the placed condition of the folding cellular phone. More specifically, the light sensor 104 detects whether or not the folding cellular phone is placed on a horizontal plane such as the top of a desk to determine if it is possible or appropriate to open/close the upper unit 100 and the lower unit 200. Incidentally, other sensors may be used for detecting the placed condition of the folding cellular phone, the light sensor being given only as an example.

The lower unit 200 includes a controller 201, a motor drive circuit 202, a motor 203, a memory 204, a radio section 205, a transmission/reception circuit 206, a microphone 207, an operation/input section 208, a light sensor 209, a battery state detector 210, and a battery 211.

The operation/input section 208 and the microphone 207 are disposed on the operation surface (inside surface) of the lower unit 200, and the light sensor 209 is disposed on the reverse (outside surface).

The operation/input section 208 is provided with operation keys and switches or buttons as an interface for inputting data or information to use various functions available in the folding cellular phone. A user inputs sender information and received message information, registers user settings with respect to the relative positions of the upper and lower units, and switches informing modes with the operation/input section 208. Examples of informing modes include, but are not limited to call/mail receive informing mode, battery state informing mode and unacknowledged call informing mode.

The microphone 207 is a voice input section used when talking on the folding cellular phone.

The light sensor 209 disposed on the reverse surface of the lower unit 200 is a sensor for detecting the placed condition of the folding cellular phone as with the light sensor 104 of the upper unit 100. The controller 201 judges the placed condition of the folding cellular phone based on the result of detection by the light sensors 104 and 209.

Besides, there is a battery chamber (not shown) for accommodating the battery 211 on the reverse surface of the lower unit 200. The battery 211, which is a power supply for driving the folding cellular phone, is oriented in the battery chamber in a prescribed direction.

The controller 201, motor drive circuit 202, motor 203, memory 204, radio section 205, transmission/reception circuit 206, and battery state detector 210 are disposed inside the lower unit 200.

The controller 201 controls the respective sections of the folding cellular phone. The display 101, informing speaker 103, light sensor 104, motor drive circuit 202, memory 204, radio section 205, operation/input section 208, light sensor 209, battery state detector 210, an open/close switch 301 and the like are connected to the controller 201.

The radio section 205 is a circuit for transmitting/receiving radio signals to/from radio base stations via a communications antenna to carry out processes such as the detection of receipt of an incoming call or data (an e-mail message, etc.). The transmission/reception circuit 206 transmits/receives audio signals to/from radio base stations during a conversation on the folding cellular phone. The transmission/reception circuit 206 converts voice input through the microphone 207 into voice signals. In addition, the transmission/reception circuit 206 converts voice signals into voice, and outputs the voice through the speaker 102.

The memory 204 stores various information and data such as information on settings for the folding cellular phone, telephone directory information and received messages. Besides, according to the embodiment of the present invention, the memory 204 stores sender information for identifying the sender of a call or a message on receipt of the call or the message, priorities of received messages, specific keywords and the like as setting information. The memory 204 also stores user setting information for controlling the opening/closing movement of the upper and lower units. The user setting information includes open/close positions or rotation angles (angles formed between the upper and lower units) with respect to, for example, each sender or priorities of received messages registered by a user.

The open/close switch 301 is located, for example, on the edge of the hinge unit 300. A user can open/close the upper unit 100 and the lower unit 200 at the flip of the open/close switch 301. Normally, the motor 203 serving as a hinge driving mechanism and other mechanisms bring the hinge unit 300 to open/close the upper unit 100 and the lower unit 200 when the open/close switch 301 is pushed or switched ON/OFF.

The motor 203 connected to the motor drive circuit 202 produces a driving force which is applied to an open/close mechanism (not shown) of the hinge unit 300 to open/close the upper unit 100 and the lower unit 200. The motor drive circuit 202 drives the motor 203 in response to switching operation by the open/close switch 301 or an instruction from the controller 201 at the time of reception. When a driving force is applied to the open/close mechanism of the hinge unit 300, the hinge unit 300 opens/closes the upper unit 100 and the lower unit 200. In other words, the hinge unit 300 changes the relative positions of the upper unit 100 and the lower unit 200 (the angle formed between the upper and lower units) or the posture (open/closed condition) of the folding cellular phone.

While the motor drive circuit 202 and the motor 203 are disposed inside the lower unit 200 in FIG. 1, they may be set in the hinge unit 300.

The battery state detector 210 detects whether or not the battery 211 is being charged and/or the remaining amount of charge in the battery 211. The battery state may be detected in a well known manner.

In the case where the folding cellular phone is set in battery state informing mode, the controller 201 controls the motor drive circuit 202 based on whether or not the battery 211 is being charged or the remaining amount of charge in the battery 211 detected by the battery state detector 210 to thereby control the open/close operation of the hinge unit 300 driven by the motor 203.

In addition, in the case where the folding cellular phone is set in unacknowledged call informing mode, when an incoming call is not answered or acknowledged, the controller 201 controls the motor drive circuit 202 according to the number of unacknowledged calls (unattended receipt of calls) from the same sender during a prescribed period of time so that the upper unit 100 and the lower unit 200 are located in prescribed relative positions (at a prescribed angle to each other).

With the above-described basic construction, in the folding cellular phone according to the embodiment of the present invention, the motor drive circuit 202 drives the motor 203 depending on informing modes under the control of the controller 201 on receipt of a call or a message. Consequently, a driving force is applied to the open/close mechanism of the hinge unit 300, and the unit 300 opens/closes (rotates) the upper unit 100 and the lower unit 200 to change the posture of the folding cellular phone. Thus, a user can be informed of the receipt of the call or the message. The folding cellular phone may perform conventional informing processes, such as ringing, light emitting, message or image display and the like, in combination with the open/close or rotative operation.

In call/mail receive informing mode, the folding cellular phone of this embodiment inform a user of the receipt of a call or a message by opening/closing the upper unit 100 and the lower unit 200 so that they are located at a prescribed angle to each other based on the sender information and/or the received message information. That is, the folding cellular phone varies the angle formed between the upper unit 100 and the lower unit 200 according to senders and/or the types or contents of received messages, which are identifiable by information obtained from incoming calls or received messages. In other words, when the folding cellular phone receives a call from a specific sender, the upper unit 100 and the lower unit 200 are arranged to form an angle associated with the sender therebetween. Besides, it is determined whether or not to change the angle formed between the upper unit 100 and the lower unit 200 based on the detection of its placed condition by the light sensors 104 and 209. Concretely, in the case where the folding cellular phone is placed on a desk in closed condition (the upper unit forms an angle of 0° with the lower unit), when receiving a call from a specific sender, the cellular phone informs a user of the receipt of the call by opening the upper unit 100 and the lower unit 200 so that they are located at a prescribed angle, for example, 90° to each other as well as by a ringing tone and information display on the display 101.

FIG. 3 shows examples of open/close operation setting information for the folding cellular phone in call/mail receive informing mode. Setting information, such as the open/close operation setting information shown in FIG. 3, for controlling the opening/closing or rotational movement of the upper and lower units on receipt of a call or a message is previously registered with the folding cellular phone of this embodiment. Angles formed between the upper and lower units on receipt of respective calls or messages are determined as the open/close operation setting information. The folding cellular phone may be provided with a prescribed setting interface for allowing a user to make the open/close operation settings. In this case, the user registers the open/close operation settings through the setting interface.

Figures 3A, 3B, 4:
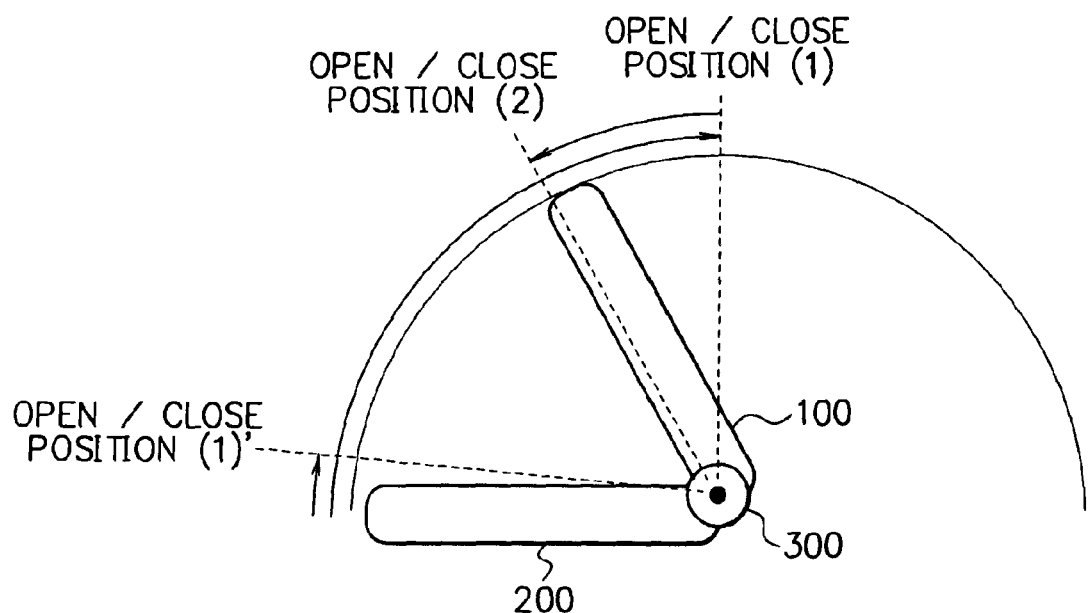
FIG. 3(a) is a table showing an association between sender information and open/close positions (open/close angles) and FIG. 3(b) is a table showing an association between received message information and open/close positions.
FIG. 4 is a side view of the folding cellular phone with a hinge driving mechanism depicted in FIG. 1 showing examples of open/close positions.

FIG. 3(a) is a table showing an association between the sender information and open/close positions (open/close angles). When receiving a call or a message from a sender included in this table (from a sender who is identified as one of sender numbers "AAA-BBB-CCC" to "MMM-NNN-OOO"), the upper and lower units are opened/closed so that they form the angle indicated by the open/close position associated with the sender to inform a user of the receipt of the call or the message. Besides, FIG. 3(b) is a table showing an association between the received message information and open/close positions (open/close angles). Referring to the priority information of a received message such as an e-mail message and associations between priorities (Lowest to Highest) and open/close positions shown in this table, the folding cellular phone opens/closes the upper and lower units so that they form the angle associated with the priority of the received message. According to the settings shown as an example in FIG. 3(b), the upper and lower units are arranged at a greater angle to each other when receiving a message having higher priority.

In FIG. 3, three types of open/close position (1), (2) and (1)' are given in the tables. The open/close position (1), (2) and (1)' correspond to three types of motor drive control (1), (2) and (1)' shown in the flowchart of FIG. 2, respectively. This is to vary open/close operation control according to the conditions of the folding cellular phone, such as the placed condition of the cellular phone detected by the light sensors 104 and 209, answering condition (whether or not a user has answered a call) and the like.

FIG. 4 is a side view of the folding cellular phone illustrating examples of open/close positions. In FIG. 4, angles formed between the upper unit 100 and the lower unit 200 are shown as the open/close positions (1), (2) and (1)'.

The open/close positions for controlling the opening/closing movement of the upper and lower units may be set to arbitrary angles, or may be selected from predetermined patterns, as for example those shown in FIG. 3.

There may be several methods for detecting the placed condition of the folding cellular phone by sensors. For example, it is assumed that the upper unit 100 and the lower unit 200 are provided with the light sensors 104 and 209, respectively, on their reverse surfaces exposed to outside when the folding cellular phone is folded. In the case where the light sensor 104 on the reverse of the upper unit 100 detects "light", while the light sensor 209 on the reverse of the lower unit 200 detects "dark", it may be determined that the folding cellular phone is placed on a substantially horizontal plane such as a desk or the like.

When the folding cellular phone is set in battery state informing mode, the battery state detector 210 detects whether or not the battery 211 is being charged and/or the remaining amount of charge in the battery 211. The controller 201 controls the motor drive circuit 202 based on the detection result to control the open/close mechanism of the hinge unit 300 driven by the motor 203. Thus, a user can be informed as to whether or not the battery 211 is being charged and/or the remaining amount of charge in the battery 211.

Figure 5:
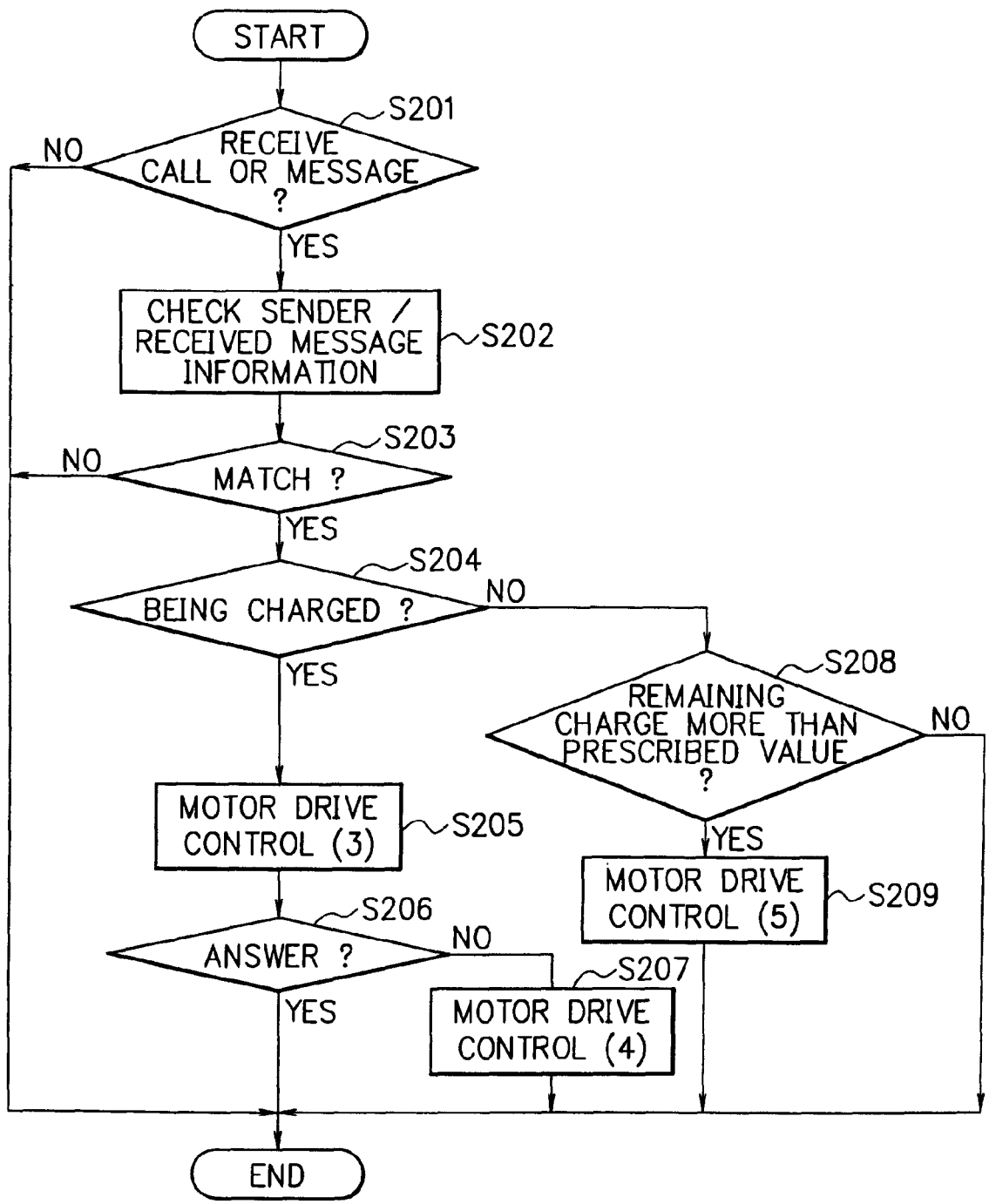
FIG. 5 is a flowchart for explaining the operation of the folding cellular phone with a hinge driving mechanism depicted in FIG. 1 in battery state informing mode.

FIG. 5 is a flowchart for explaining the operation of the folding cellular phone in battery state informing mode. FIG. 6 shows examples of open/close operation setting information for the folding cellular phone in battery state informing mode. Setting information, such as the open/close operation setting information shown in FIG. 6, for determining the movement of the upper and lower units in the informing process is registered with the folding cellular phone in advance as in call/mail receive informing mode described previously in connection with FIG. 3. In FIG. 6, tree types of open/close position (3) to (5) correspond to three types of motor drive control (3) to (5) shown in the flowchart of FIG. 5, respectively.

In the case where the folding cellular phone is set in unacknowledged call informing mode, when an incoming call is not answered or acknowledged, the upper unit 100 and the lower unit 200 are arranged in prescribed relative positions according to the number of unacknowledged calls (unattended receipt of calls) from the same sender during a prescribed time period under the control of the controller 201. Thus, a user can be informed of the presence of unacknowledged calls and the number of unacknowledged calls.

Figure 7:
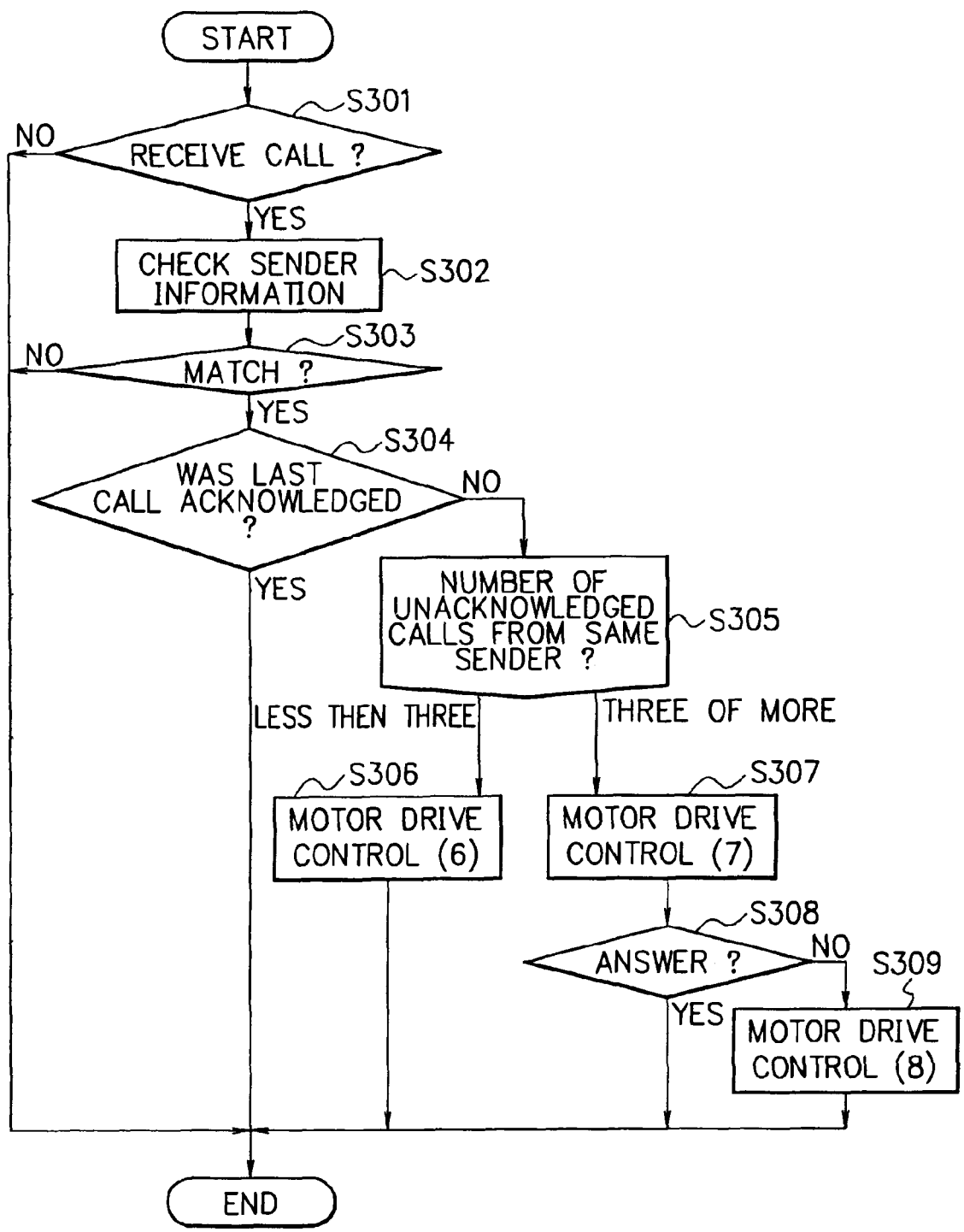
FIG. 7 is a flowchart for explaining the operation of the folding cellular phone with a hinge driving mechanism depicted in FIG. 1 in unacknowledged call informing mode.
Figures 8, 9:
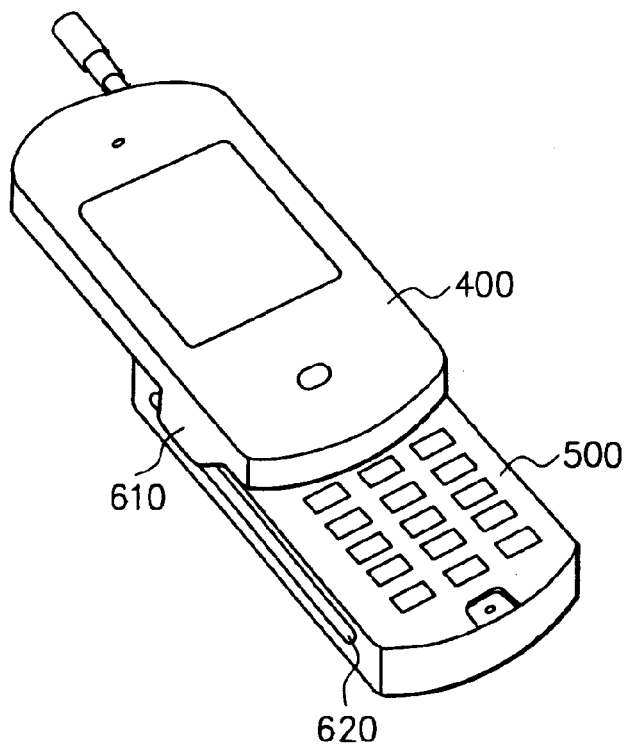
FIG. 8 shows examples of open/close operation setting information for the folding cellular phone depicted in FIG. 1 in unacknowledged call informing mode.
FIG. 9 is an exterior view of a sliding cellular phone in open condition according to an embodiment of the present invention.

FIG. 7 is a flowchart for explaining the operation of the folding cellular phone in unacknowledged call informing mode. FIG. 8 shows examples of open/close operation setting information for the folding cellular phone in unacknowledged call informing mode. Setting information, such as the open/close operation setting information shown in FIG. 8, for determining the movement of the upper and lower units in the informing process is registered with the folding cellular phone in advance as in call/mail receive informing mode described previously in connection with FIG. 3. In FIG. 8, three types of open/close position (6) to (8) correspond to three types of motor drive control (6) to (8) shown in the flowchart of FIG. 7, respectively.

Incidentally, the placed condition of the folding cellular phone may be detected without using light sensors and without providing sensors on both the upper unit 100 and the lower unit 200.

In the following, a description will be made of the operation of the folding cellular phone with a hinge driving mechanism in call/mail receive informing mode referring to FIGS. 2 to 4.

In the folding cellular phone according to the embodiment of the present invention, first, the radio section 205 detects the receipt of a call or a message, and informs the controller 201 about the detection (step S101, Yes). Next, the controller 201 checks, for example, the sender number of the call or the message as the sender information and/or the priority of the message as the received message information (step S102). Subsequently, the controller 201 matches the information obtained from the received call or message with the registered sender information and/or received message information (open/close operation setting information) stored in the memory 204 (step S103). When the information obtained from the received call or message does not match any of, for example, sender numbers (sender information) and/or priorities (received message information) stored in the memory 204, that is, when open/close operation is not required to inform a user of the receipt of the call or the message from the sender (step S103, No), normal informing processes are performed. When the information obtained from the received call or message matches the sender information and/or received message information stored in the memory 204, that is, when open/close operation is required to inform a user of the receipt of the call or the message from the sender (step S103, Yes), the following motor drive control (open/close operation—informing control) process is carried out.

The light sensors 104 and 209 detect whether or not the folding cellular phone is placed on a substantially horizontal plane such as the top of a desk. Having determined to perform open/close operation—informing control process by checking the sender/received message information, the controller 201 determines if it is possible or appropriate to open/close the upper unit 100 and the lower unit 200 based on the output of the light sensors 104 and 209 (step S104). Thus, the type of motor drive control is determined (open/close position (1) or (1)' is selected) based on judgments about the sender/received message information and the placed condition of the folding cellular phone made at steps S103 and S104. When the controller 201 has determined that the folding cellular phone is placed on a substantially horizontal plane such as a desk or the like (step S104, Yes), motor drive control (1) is to be executed. When the controller 201 has determined that it is impossible or inappropriate to open/close the upper unit 100 and the lower unit 200 (step S104, No), motor drive control (1)' is to be executed.

Depending on the selected open/close position (open/close position (1) or (1)'), the controller 201 controls the motor drive circuit 202 and the motor 203 based on the setting information as shown in FIG. 3 so that the upper unit 100 and the lower unit 200 are located in prescribed relative positions or at a prescribed angle to each other (step S105 or S108). Besides, visual and acoustic informing processes are also performed through the display 101 and the informing speaker 103. That is, the display 101 on the upper unit 100 displays the sender information or the like and the informing speaker 103 outputs the ring tone.

In the case where the folding cellular phone is placed on a substantially horizontal plane such as a desk, and the user does not answer or acknowledge the call (step S106, No), motor drive control (2) is to be executed. Accordingly, the controller 201 controls the motor drive circuit 202 and the motor 203 so that the upper unit 100 and the lower unit 200 are located in prescribed relative positions or at a prescribed angle (open/close position (2)) to each other (step S107). Thereby, it is possible to inform the user as to the presence of the unacknowledged call by the angle formed between the upper unit 100 and the lower unit 200.

An example of open/close operation control will be explained referring to FIG. 4. When it is determined that the folding cellular phone is placed on a desk in closed condition and motor drive control (1) is executed, the upper unit 100 and the lower unit 200 are opened so as to be at an angle of about 90° (open/close position (1)) to each other. When the folding cellular phone is not placed on a desk and motor drive control (1)' is executed, the upper and lower units are arranged at an angle of from 0 to 10 (open/close position (1)') to each other. After the upper and lower units are opened at an angle of about 90° (open/close position (1)) to each other, in the case where the user has not answered the call and motor drive control (2) is executed, the upper and lower units are closed so as to be at an angle of about 60° (open/close position (2)) to each other to inform the user about the unanswered call.

In the following, a description will be made of the operation of the folding cellular phone with a hinge driving mechanism in battery state informing mode referring to FIGS. 5 and 6.

In the folding cellular phone according to the embodiment of the present invention, first, the radio section 205 detects the receipt of a call or a message, and informs the controller 201 about the detection (step S201, Yes). Next, the controller 201 checks, for example, the sender number of the call or the message as the sender information and/or the priority of the message as the received message information (step S202). Subsequently, the controller 201 matches the information obtained from the received call or message with the registered sender information and/or received message information (open/close operation setting information) stored in the memory 204 (step S203).

When the information obtained from the received call or message does not match any of, for example, sender numbers (sender information) and/or priorities (received message information) stored in the memory 204, that is, when open/close operation is not required to inform a user of the receipt of the call or the message from the sender (step S203, No), normal informing processes are performed. When the information obtained from the received call or message matches the sender information and/or received message information stored in the memory 204, that is, when open/close operation is required to inform a user of the receipt of the call or the message from the sender (step S203, Yes), the following motor drive control (open/close operation—informing control) process is carried out.

The battery state detector 210 detects whether or not the battery 211 is being charged and/or the remaining amount of charge in the battery 211. Having determined to perform open/close operation—informing control process by checking the sender/received message information, the controller 201 determines whether or not the battery 211 is being charged based on the detection result or output from the battery state detector 210 (step S204). When the battery 211 is not being charged, the controller 201 compares the remaining amount of charge in the battery 211 with a predetermined value for judging whether it is possible or appropriate to open/close the upper unit 100 and the lower unit 200 (step S208).

Thus, the type of motor drive control is determined (open/close position (3) or (5) is selected) based on judgments about the sender/received message information and the battery state made at steps S203, S204 and S208.

Depending on the selected open/close position (open/close position (3) or (5)), the controller 201 controls the motor drive circuit 202 and the motor 203 (step S205 or S209).

In the case where the battery 211 of the folding cellular phone is being charged (step S204, Yes), and the user does not answer or acknowledge the call (step S206, No), motor drive control (4) is to be executed. Accordingly, the controller 201 controls the motor drive circuit 202 and the motor 203 so that the upper unit 100 and the lower unit 200 are located in prescribed relative positions or at a prescribed angle (open/close position (4)) to each other (step S207). Thereby, it is possible to inform the user as to the presence of the unacknowledged call by the angle formed between the upper and lower units.

In the following, a description will be made of the operation of the folding cellular phone with a hinge driving mechanism in unacknowledged call informing mode referring to FIGS. 7 and 8.

In the folding cellular phone according to the embodiment of the present invention, first, the radio section 205 detects the receipt of a call, and informs the controller 201 about the detection (step S301, Yes). Next, the controller 201 checks, for example, the sender number of the call as the sender information (step S302), and matches the sender information obtained from the received call with the registered sender information stored in the memory 204 (step S303).

When the information obtained from the received call does not match any of, for example, sender numbers (sender information) stored in the memory 204, that is, when open/close operation is not required to inform a user of the receipt of the call from the sender (step S303, No), normal informing processes are performed. When the information obtained from the received call matches the sender information stored in the memory 204, that is, when open/close operation is required to inform a user of the receipt of the call from the sender (step S303, Yes), the controller 201 determines whether or not the last call within, for example, 6 hours was an unacknowledged call based on an incoming call history stored in the memory 204. When the last call was an unacknowledged call (step 304, Yes), the following motor drive control (open/close operation—informing control) process is carried out.

When the last call was an unacknowledged call, the number of unacknowledged calls from the same sender during a prescribed time period (e.g. 6 hours) is counted with reference to the incoming call history stored in the memory 204 (step S305). In FIG. 7, when the number of unacknowledged calls is less than 3, motor drive control (6) is to be executed. On the other hand, when there are 3 or more unacknowledged calls, motor drive control (7) is to be executed (steps S306 and S307).

Additionally, in the case where the user does not answer the call at step S307 (step S308, No), motor drive control (8) is to be executed. Accordingly, the controller 201 controls the motor drive circuit 202 and the motor 203 so that the upper unit 100 and the lower unit 200 are located in prescribed relative positions or at a prescribed angle (open/close position (8)) to each other (step S309). Thereby, it is possible to inform the user as to the presence of the unacknowledged call by the angle formed between the upper and lower units.

While the number of unacknowledged calls or the threshold that determines the type of motor drive control is 3 in FIG. 7, the user may set an arbitrary number as the threshold.

Besides, the time for counting the number of unacknowledged calls from a specific sender is not limited to 6 hours, and the user may set an arbitrary period of time as the count time.

In the above-mentioned informing operation of the folding cellular phone in each informing mode, the upper unit 100 and the lower unit 200 just move into prescribed relative positions so as to be opened/closed at a prescribed angle to each other according to setting information, and stay therein. However, the upper and lower units may be repeatedly opened/closed or rotated prescribed degrees back and forth at prescribed intervals during the informing period.

Further, the received message information detected by the folding cellular phone is not limited to the priorities of received messages. The received message information may be previously specified keywords contained in mail addresses of senders, messages and/or titles of messages. In this case, open/close operation can be controlled according to the keywords.

In the above-described embodiment, the placed condition of the cellular phone is detected by sensors, and open/close operation is performed based on the detection result. However, a user may also switch between normal mode and mode for performing open/close operation by prescribed input. This allows a user to place the folding cellular phone on a desk or the like as needed and switch modes from normal mode to mode for performing open/close operation by the input.

The folding cellular phone may further include a function for stopping open/close operation when detecting a prescribed reactive force which cause an obstruction to the opening/closing movement of the upper and lower units. With this function, it is possible to prevent an undesired failure and a malfunction due to such obstruction.

While the folding cellular phone is taken as an example in the above-described embodiment, the present invention can be applied to general portable information terminal equipment, such as PDA (Personal Digital Assistant), which is provided with a radio communication function and comprised of upper and lower units rotatably coupled to one another by a connecting section driven by a connecting section driving mechanism.

For example, the present invention is applicable to a sliding cellular phone as shown in FIGS. 9 and 10 in similar fashion.

FIG. 9 is an exterior view of a sliding cellular phone with its upper unit 400 and lower unit 500 being open. FIG. 10 is an exterior view of the sliding cellular phone in closed condition.

The sliding cellular phone is provided with a slide structure 600 including slide parts 610 set on the sides of the upper unit 400 and slide rails 620 set on the sides of the lower unit 500 in sliding engagement with the slide parts 610. The upper unit 400 and the lower unit 500 are slidably connected to each other by the slide structure 600.

FIG. 11 shows examples of open/close operation setting information for the sliding cellular phone in call/mail receive informing mode. In the case where the present invention is applied to the sliding cellular phone, open/close positions registered as setting information are set by the distance that the upper unit 400 or lower unit 500 is to be moved as shown in FIG. 11.

When receiving a call or a message, a controller controls a motor to slide the slide parts 610 along the slide rails 620 a predetermined distance so that the upper unit 400 and the lower unit 500 are arranged in prescribed relative positions. Thereby, a user can be informed of the receipt of the call or the message.

FIG. 12 is a side view of the sliding cellular phone showing examples of open/close positions in the sliding movements.

Besides, the present invention is applicable to a turning cellular phone as shown in FIGS. 13 and 14 in similar fashion.

FIG. 13 is an exterior view of a turning cellular phone in open condition. FIG. 14 is an exterior view of the turning cellular phone in closed condition.

The turning cellular phone comprises an upper unit 700, a lower unit 800 and a rotative connector 900 that rotatably supports the upper unit 700 and lower unit 800 on a rotation axis substantially perpendicular to a display surface. The upper unit 700 and the lower unit 800 are rotatably connected to each other by the rotative connector 900.

FIG. 15 shows examples of open/close operation setting information for the turning cellular phone in call/mail receive informing mode. In the case where the present invention is applied to the turning cellular phone, open/close positions registered as setting information are provided by the angle formed between the upper unit 700 and the lower unit 800 when they are rotated on the axis substantially perpendicular to a display surface.

When receiving a call or a message, a controller controls a motor to rotate the upper unit 700 and/or the lower unit 800 on the rotative connector 900 so that they are located at a prescribed angle to each other. Thereby, a user can be informed of the receipt of the call or the message.

FIG. 16 is an overhead view of the turning cellular phone showing examples of open/close positions in the rotational movements.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What is claimed is:

1. Portable information terminal equipment comprising:
    two units;
    a connecting section for connecting the two units with each other for relative movement;
    a connecting section driving mechanism for changing the relative positions of the two units to open/close the units;
    a controller for controlling the connecting section driving mechanism to move either or both the units from a first relative position to a relative position at a prescribed relative angle to each other when receiving a call or a message to thereby inform a user of the receipt of the call or the message; and
    a battery state detector for detecting whether or not a battery, which is a power supply for driving the equipment, is being charged and/or the remaining amount of charge in the battery, wherein the controller controls the connecting section driving mechanism based on the result of the detection by the battery state detector.

2. The portable information terminal equipment claimed in claim 1, wherein the controller provides open/close operation control so that the two units are located in prescribed relative positions when an incoming call is not answered; and
    further comprising a battery state detector for detecting whether or not a battery, which is a power supply for driving the equipment, is being charged and/or the remaining amount of charge in the battery, wherein the controller controls the connecting section driving mechanism based on the result of the detection by the battery state detector.

3. The portable information terminal equipment claimed in claim 1, further comprising:
    a detector for detecting the placed condition of the equipment, wherein the controller provides open/close operation control based on the placed condition of the equipment detected by the detector, and
    a battery state detector for detecting whether or not a battery, which is a power supply for driving the equipment, is being charged and/or the remaining amount of charge in the battery, wherein the controller controls the connecting section driving mechanism based on the result of the detection by the battery state detector.

4. The portable information terminal equipment claimed in claim 1, wherein the two units repeatedly open/close at prescribed intervals under the control of the controller, and
    further comprising a battery state detector for detecting whether or not a battery, which is a power supply for driving the equipment, is being charged and/or the remaining amount of charge in the battery, wherein the controller controls the connecting section driving mechanism based on the result of the detection by the battery state detector.

5. The portable information terminal equipment claimed in claim 1, wherein the controller provides open/close operation control so that the two units are located in prescribed relative positions when an incoming call is not answered; and
    wherein, when an incoming call is not answered, the two units are arranged in prescribed relative positions according to the number of unanswered calls from the same sender during a prescribed time period under the control of the controller.

6. The portable information terminal equipment claimed in claim 1, further comprising a detector for detecting the placed condition of the equipment, wherein the controller provides open/close operation control based on the placed condition of the equipment detected by the detector;
    wherein, when an incoming call is not answered, the two units are arranged in prescribed relative positions according to the number of unanswered calls from the same sender during a prescribed time period under the control of the controller.

7. The portable information terminal equipment claimed in claim 1, wherein:
    the two units repeatedly open/close at prescribed intervals under the control of the controller;
    when an incoming call is not answered, the two units are arranged in prescribed relative positions according to the number of unanswered calls from the same sender during a prescribed time period under the control of the controller.

8. The portable information terminal equipment claimed in claim 1, wherein, when an incoming call is not answered, the two units are arranged in prescribed relative positions according to the number of unanswered calls from the same sender during a prescribed time period under the control of the controller.

9. The portable information terminal equipment claimed in claim 1, wherein:
    the controller provides open/close operation control so that the two units are located in prescribed relative positions when an incoming call is not answered; and
    the connecting section has a slide structure including slide rails set on one of the units and slide parts set on the other unit in sliding engagement with the slide rail; and the connecting section driving mechanism changes the relative positions of the two units by sliding the unit having the slide parts along the slide rails.

10. The portable information terminal equipment claimed in claim 1, further comprising a detector for detecting the placed condition of the equipment, wherein the controller provides open/close operation control based on the placed condition of the equipment detected by the detector, and, wherein:
the connecting section has a slide structure including slide rails set on one of the units and slide parts set on the other unit in sliding engagement with the slide rail; and
the connecting section driving mechanism changes the relative positions of the two units by sliding the unit having the slide parts along the slide rails.

11. The portable information terminal equipment claimed in claim 1, wherein:
the connecting section has a slide structure including slide rails set on one of the units and slide parts set on the other unit in sliding engagement with the slide rail; and
the connecting section driving mechanism changes the relative positions of the two units by sliding the unit having the slide parts along the slide rails.

12. The portable information terminal equipment claimed in claim 1, wherein:
the controller provides open/close operation control so that the two units are located in prescribed relative positions when an incoming call is not answered; and
the connecting section rotatably supports the two units on a rotation axis substantially perpendicular to a display surface; and
the connecting section driving mechanism changes the relative positions of the two units by rotating either or both the units on the rotation axis.

13. The portable information terminal equipment claimed in claim 1, further comprising a detector for detecting the placed condition of the equipment, wherein the controller provides open/close operation control based on the placed condition of the equipment detected by the detector, and, wherein:
the connecting section rotatably supports the two units on a rotation axis substantially perpendicular to a display surface; and
the connecting section driving mechanism changes the relative positions of the two units by rotating either or both the units on the rotation axis.

14. The portable information terminal equipment claimed in claim 1, wherein:
the two units repeatedly open/close at prescribed intervals under the control of the controller;
the connecting section rotatably supports the two units on a rotation axis substantially perpendicular to a display surface; and
the connecting section driving mechanism changes the relative positions of the two units by rotating either or both the units on the rotation axis.

15. The portable information terminal equipment claimed in claim 1, wherein:
the connecting section rotatably supports the two units on a rotation axis substantially perpendicular to a display surface; and
the connecting section driving mechanism changes the relative positions of the two units by rotating either or both the units on the rotation axis.

16. Portable information terminal equipment comprising:
two units;
a connecting section for connecting the two units with each other for relative movement;
a connecting section driving mechanism for changing the relative positions of the two units to open/close the units; and
a controller for controlling the connecting section driving mechanism to move either or both the units from a first relative position to a relative position at a prescribed relative angle to each other when receiving a call or a message based on information about the sender of the call or the message and/or the received message to thereby inform a user of the receipt of the call or the message;
a battery state detector for detecting whether or not a battery, which is a power supply for driving the equipment, is being charged and/or the remaining amount of charge in the battery, wherein the controller controls the connecting section driving mechanism based on the result of the detection by the battery state detector.

17. The portable information terminal equipment claimed in claim 16, wherein the controller provides open/close operation control so that the two units are located in prescribed relative positions when an incoming call is not answered; and
further comprising a battery state detector for detecting whether or not a battery, which is a power supply for driving the equipment, is being charged and/or the remaining amount of charge in the battery, wherein the controller controls the connecting section driving mechanism based on the result of the detection by the battery state detector.

18. The portable information terminal equipment claimed in claim 16, further comprising:
a detector for detecting the placed condition of the equipment, wherein the controller provides open/close operation control based on the placed condition of the equipment detected by the detector; and
a battery state detector for detecting whether or not a battery, which is a power supply for driving the equipment, is being charged and/or the remaining amount of charge in the battery, wherein the controller controls the connecting section driving mechanism based on the result of the detection by the battery state detector.

19. The portable information terminal equipment claimed in claim 16, further comprising:
a setting interface for registering user settings with respect to the sender information, received message information and the relative positions of the two units, wherein the controller controls the connecting section driving mechanism in a manner so as to change the relative positions of the units when receiving a call or a message based on the user settings; and
a battery state detector for detecting whether or not a battery, which is a power supply for driving the equipment, is being charged and/or the remaining amount of charge in the battery, wherein the controller controls the connecting section driving mechanism based on the result of the detection by the battery state detector.

20. The portable information terminal equipment claimed in claim 16, wherein the two units repeatedly open/close at prescribed intervals under the control of the controller; and
further comprising a battery state detector for detecting whether or not a battery, which is a power supply for driving the equipment, is being charged and/or the remaining amount of charge in the battery, wherein the controller controls the connecting section driving mechanism based on the result of the detection by the battery state detector.

21. The portable information terminal equipment claimed in claim 16, wherein the controller provides open/close operation control so that the two units are located in prescribed relative positions when an incoming call is not answered; and wherein, when an incoming call is not answered, the two units are arranged in prescribed relative positions according to the number of unanswered calls from the same sender during a prescribed time period under the control of the controller.

22. The portable information terminal equipment claimed in claim 16, further comprising a detector for detecting the placed condition of the equipment, wherein the controller provides open/close operation control based on the placed condition of the equipment detected by the detector;

wherein, when an incoming call is not answered, the two units are arranged in prescribed relative positions according to the number of unanswered calls from the same sender during a prescribed time period under the control of the controller.

23. The portable information terminal equipment claimed in claim 16, further comprising a setting interface for registering user settings with respect to the sender information, received message information and the relative positions of the two units, wherein the controller controls the connecting section driving mechanism in a manner so as to change the relative positions of the units when receiving a call or a message based on the user settings; and wherein, when an incoming call is not answered, the two units are arranged in prescribed relative positions according to the number of unanswered calls from the same sender during a prescribed time period under the control of the controller.

24. The portable information terminal equipment claimed in claim 16, wherein:

the two units repeatedly open/close at prescribed intervals under the control of the controller, and when an incoming call is not answered, the two units are arranged in prescribed relative positions according to the number of unanswered calls from the same sender during a prescribed time period under the control of the controller.

25. The portable information terminal equipment claimed in claim 16, wherein, when an incoming call is not answered, the two units are arranged in prescribed relative positions according to the number of unanswered calls from the same sender during a prescribed time period under the control of the controller.

26. The portable information terminal equipment claimed in claim 16, wherein:

the controller provides open/close operation control so that the two units are located in prescribed relative positions when an incoming call is not answered;

the connecting section has a slide structure including slide rails set on one of the units and slide parts set on the other unit in sliding engagement with the slide rail; and the connecting section driving mechanism changes the relative positions of the two units by sliding the unit having the slide parts along the slide rails.

27. The portable information terminal equipment claimed in claim 16, further comprising a detector for detecting the placed condition of the equipment, wherein the controller provides open/close operation control based on the placed condition of the equipment detected by the detector; and wherein:

the connecting section has a slide structure including slide rails set on one of the units and slide parts set on the other unit in sliding engagement with the slide rail; and the connecting section driving mechanism changes the relative positions of the two units by sliding the unit having the slide parts along the slide rails.

28. The portable information terminal equipment claimed in claim 16, further comprising a setting interface for registering user settings with respect to the sender information, received message information and the relative positions of the two units, wherein:

the controller controls the connecting section driving mechanism in a manner so as to change the relative positions of the units when receiving a call or a message based on the user settings;

the connecting section has a slide structure including slide rails set on one of the units and slide parts set on the other unit in sliding engagement with the slide rail; and the connecting section driving mechanism changes the relative positions of the two units by sliding the unit having the slide parts along the slide rails.

29. The portable information terminal equipment claimed in claim 16, further comprising a setting interface for registering user settings with respect to the sender information, received message information and the relative positions of the two units, wherein the controller controls the connecting section driving mechanism in a manner so as to change the relative positions of the units when receiving a call or a message based on the user settings; and wherein:

the connecting section has a slide structure including slide rails set on one of the units and slide parts set on the other unit in sliding engagement with the slide rail; and the connecting section driving mechanism changes the relative positions of the two units by sliding the unit having the slide parts along the slide rails.

30. The portable information terminal equipment claimed in claim 16, wherein:

the two units repeatedly open/close at prescribed intervals under the control of the controller;

the connecting section has a slide structure including slide rails set on one of the units and slide parts set on the other unit in sliding engagement with the slide rail; and the connecting section driving mechanism changes the relative positions of the two units by sliding the unit having the slide parts along the slide rails.

31. The portable information terminal equipment claimed in claim 16, wherein:

the connecting section has a slide structure including slide rails set on one of the units and slide parts set on the other unit in sliding engagement with the slide rail; and the connecting section driving mechanism changes the relative positions of the two units by sliding the unit having the slide parts along the slide rails.

32. The portable information terminal equipment claimed in claim 16, wherein:

the controller provides open/close operation control so that the two units are located in prescribed relative positions when an incoming call is not answered;

the connecting section rotatably supports the two units on a rotation axis substantially perpendicular to a display surface; and the connecting section driving mechanism changes the relative positions of the two units by rotating either or both the units on the rotation axis.

33. The portable information terminal equipment claimed in claim 16, further comprising a detector for detecting the placed condition of the equipment, wherein the controller provides open/close operation control based on the placed condition of the equipment detected by the detector; and wherein:
- the connecting section rotatably supports the two units on a rotation axis substantially perpendicular to a display surface; and
- the connecting section driving mechanism changes the relative positions of the two units by rotating either or both the units on the rotation axis.

34. The portable information terminal equipment claimed in claim 16, further comprising a setting interface for registering user settings with respect to the sender information, received message information and the relative positions of the two units, wherein:
- the controller controls the connecting section driving mechanism in a manner so as to change the relative positions of the units when receiving a call or a message based on the user settings;
- the connecting section rotatably supports the two units on a rotation axis substantially perpendicular to a display surface; and
- the connecting section driving mechanism changes the relative positions of the two units by rotating either or both the units on the rotation axis.

35. The portable information terminal equipment claimed in claim 16, wherein:
- the two units repeatedly open/close at prescribed intervals under the control of the controller;
- the connecting section rotatably supports the two units on a rotation axis substantially perpendicular to a display surface; and
- the connecting section driving mechanism changes the relative positions of the two units by rotating either or both the units on the rotation axis.

36. The portable information terminal equipment claimed in claim 16, wherein:
- the connecting section rotatably supports the two units on a rotation axis substantially perpendicular to a display surface; and
- the connecting section driving mechanism changes the relative positions of the two units by rotating either or both the units on the rotation axis.

37. The portable information terminal equipment claimed in claim 16, wherein:
- the connecting section rotatably supports the two units on a rotation axis substantially perpendicular to a display surface; and
- the connecting section driving mechanism changes the relative positions of the two units by rotating either or both the units on the rotation axis.

38. The portable information terminal equipment claimed in claim 16, wherein, when an incoming call is not answered, the two units are arranged in prescribed relative positions according to the number of unanswered calls from the same sender during a prescribed time period under the control of the controller.

39. The portable information terminal equipment claimed in claim 38, wherein:
- the connecting section has a slide structure including slide rails set on one of the units and slide parts set on the other unit in sliding engagement with the slide rail; and
- the connecting section driving mechanism changes the relative positions of the two units by sliding the unit having the slide parts along the slide rails.

40. The portable information terminal equipment claimed in claim 38, wherein:
- the connecting section rotatably supports the two units on a rotation axis substantially perpendicular to a display surface; and
- the connecting section driving mechanism changes the relative positions of the two units by rotating either or both the units on the rotation axis.

* * * * *